United States Patent [19]

Schneider et al.

[11] Patent Number: 5,778,539
[45] Date of Patent: Jul. 14, 1998

[54] DEVICE FOR HAND TOOLS ATTACHED TO A POLE

[75] Inventors: Manfred Schneider, St. Wendel; Gerhard Staudt, Schmelz, both of Germany

[73] Assignee: Wolf-Garten GmbH & Co. KG, Betzdorf, Germany

[21] Appl. No.: 765,343

[22] PCT Filed: Jun. 20, 1995

[86] PCT No.: PCT/EP95/02390

§ 371 Date: Dec. 23, 1996

§ 102(e) Date: Dec. 23, 1996

[87] PCT Pub. No.: WO95/35023

PCT Pub. Date: Dec. 28, 1995

[30] Foreign Application Priority Data

Jun. 21, 1994 [DE] Germany .................. 44 21 659.9

[51] Int. Cl.$^6$ ............................................. A01G 3/025
[52] U.S. Cl. .................... 30/231; 30/249; 254/391
[58] Field of Search ............... 30/231, 249, 296.1; 254/391; 24/115 R

[56] References Cited

U.S. PATENT DOCUMENTS 2,259,642  10/1941  Hoyt .
4,224,739   9/1980  Emblidge ................ 30/294

FOREIGN PATENT DOCUMENTS

| 179440 | 8/1954 | Austria . | |
|---|---|---|---|
| 1089020 | 9/1954 | France | 30/249 |
| 816616 | 10/1951 | Germany | 30/249 |
| 949784 | 9/1956 | Germany | 30/249 |
| 143756 | 9/1980 | Germany | 254/391 |
| 3137120 | 9/1981 | Germany . | |
| 3640390 | 11/1986 | Germany . | |
| A582464 | 12/1976 | Switzerland . | |
| 918785 | 2/1963 | United Kingdom | 254/391 |
| 1132800 | 11/1968 | United Kingdom . | |
| 2143460 | 2/1985 | United Kingdom . | |

*Primary Examiner*—Hwei-Siu Payer
*Attorney, Agent, or Firm*—Ostrolenk, Faber, Gerb & Soffen, LLP

[57] ABSTRACT

The invention relates to a pull grip which can be attached to any place on a pull rope in order to operate the cutting tools via the pull rope in a convenient position which is ergonometrically favorable. The pull grip is in this connection guided by a passage hole on the pull rope and can be clamped by oblique pull by clamping ribs which are arranged within an angular segment recess. In order to facilitate the elimination of the clamping of the rope, a release device in the form of a release sleeve provided with handle can be provided which guides the pull rope and is displaceable within the passage hole or a bearing sleeve adjoining same into the angular segment recess in order to lift the rope out of the clamping ribs. Together with the pull grip a rope storage can be used which can be placed on the lower end of the pole, particularly a telescopic pole, and winds up the free length of rope, whereby assurance is had that the rope always lies closely adjacent and substantially parallel to the pole and can be conveniently reached.

9 Claims, 5 Drawing Sheets

FIG. 2
FIG. 3
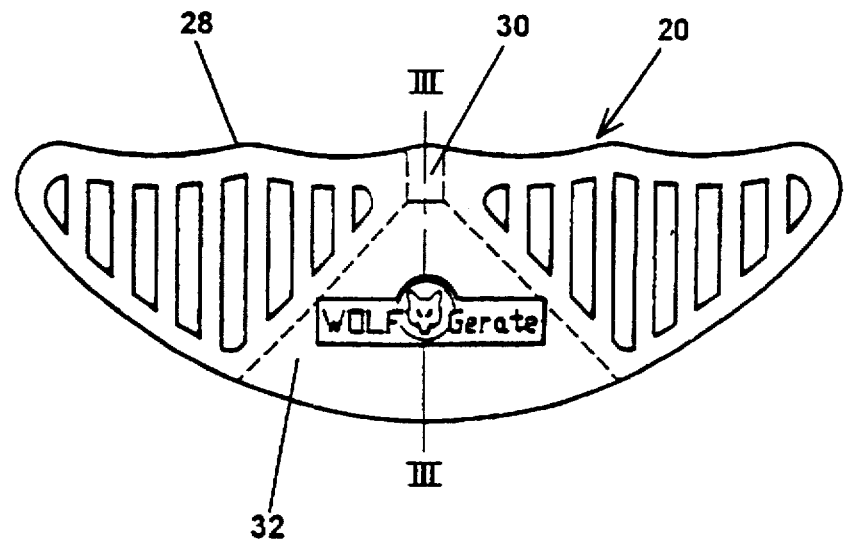
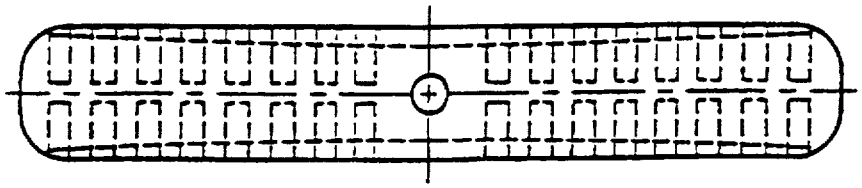
FIG. 4
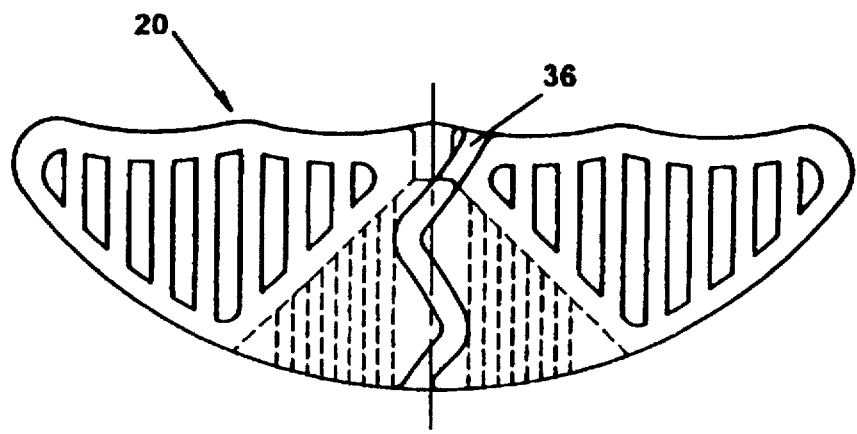
FIG. 6

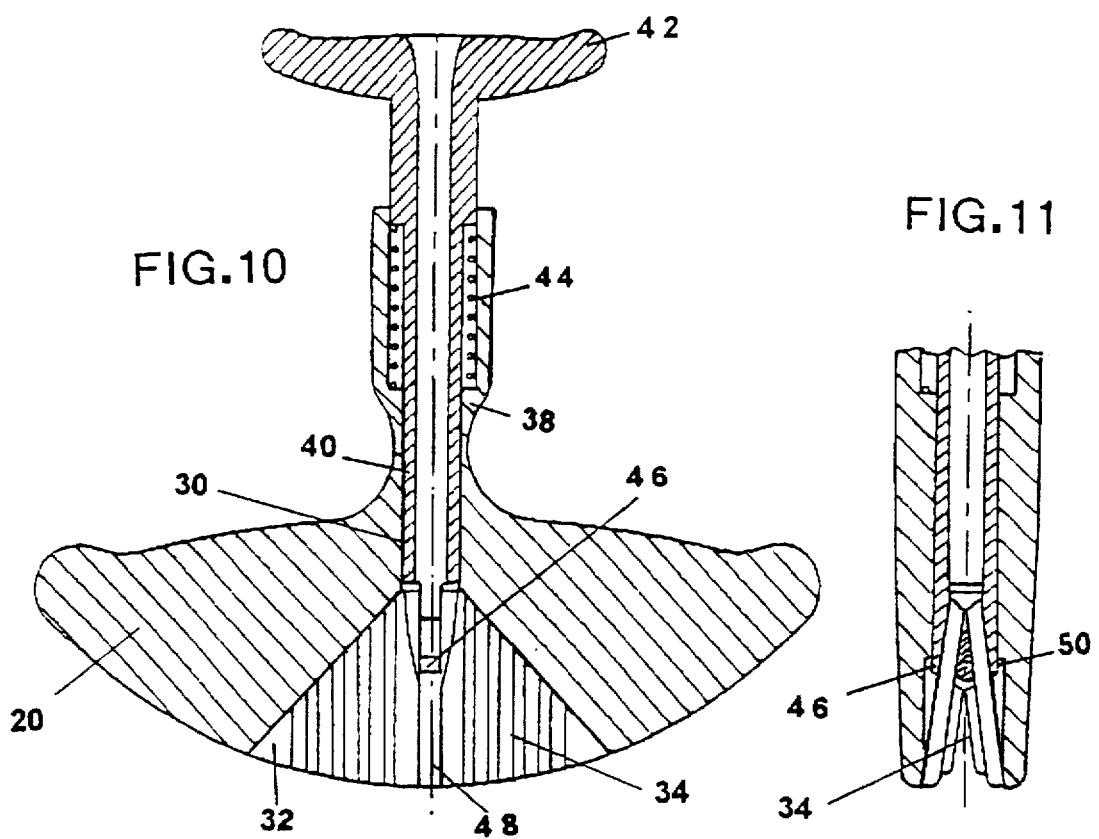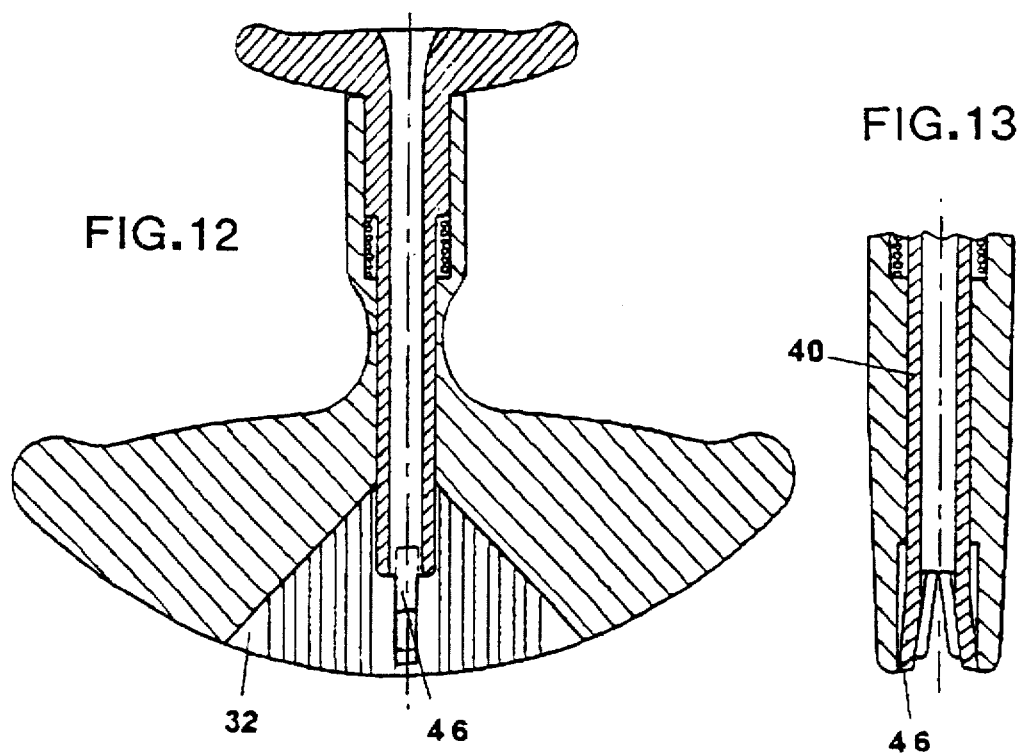

DEVICE FOR HAND TOOLS ATTACHED TO A POLE

The present invention relates to a device for hand tools which are attached to a pole and can be actuated by a pull rope which is provided with a pull handle, particularly for tree pruning shears and other manual cutting tools suitable for the pruning or cutting of standing trees.

In the known pruning shears, branch cutters or other tools which can be operated by a pull rope, it is customary to fasten the pull grip on the end of the pull rope so that the pull grip always has a predetermined distance from the end of the pole. This meant that the pull grip could be operated conveniently only when the material to be cut was at a given height. In all other positions, the rope had to be shortened so that actuation was frequently not effected by means of the pull grip but by wrapping the rope around one's hand and pulling on it. This disadvantage is of importance in particular in the case of telescopically extendable poles, since the length of the rope must be adapted to the greatest length of the telescopic pole and this length is frequently not required.

The object of the present invention is therefore to make the pull grip placed on the pull rope available to the user at all times in the manner which is ergonometrically most favorable.

This object is achieved by the features set forth in the body of claim 1. Due to the fact that the pull grip is guided along the pull rope and can be fastened at any place, the result is obtained that, with any height of the cutting tool, the pull grip can always be grasped by the extended arm and pulled towards one's body. It is therefore no longer necessary to change the length of the pull rope or to grasp the pull rope itself.

The rope, which is clamped fast by clamping ribs in an angular segment release, can be pulled out of the clamping device by a lateral pull so that it can again be moved freely along the rope. In order to facilitate this release of the rope, in accordance with a further feature of the invention, a manually actuated release device by which the rope can be easily lifted out of the clamping ribs is provided. This release device consists of a release sleeve which is guided in the passage hole for the rope which is extended upward through a bearing sleeve and can be pushed into the region of the angular segment recess. This release sleeve is provided with a handle by which the release sleeve can be conveniently pushed into the angular segment region against the force of a return spring.

A further disadvantage of known devices is that upon the positioning of the manual cutting tool, the rope can easily slip out of one's hand and, in case of a corresponding oblique position of the pole, is then beyond the reach of the hand so that the tool has to be positioned all over again after recovering the rope. Furthermore, the remaining length of rope when the telescopic pole was not fully extended or upon an oblique position thereof lay on the ground and the rope could become entangled or catch on objects present on the ground so that a new positioning frequently had to be effected because of this.

Another object of the invention therefore is to hold the pull rope together with the pull handle at all times in the reachable proximity of the pole.

This object is achieved by the features set forth in the body of claim 9. The rope storage which is provided with a winding reel which is under spring tension can be fastened to the lower end of the pole and also serves to support the pole against one's body, for which purpose the lower part of the reel housing is provided with a soft rubber pad which prevents sliding on the body and, due to the larger surface, does not result in any unpleasant pressure points. As soon as the cutting tool has been brought into cutting position, and after adjustment of the telescopic pole to the required length, the rope storage can be supported on the body, preferably on the thigh. The pull rope extends in the vicinity of the pole and can be conveniently grasped by means of the pull handle, in which connection the pull handle can be fastened previously or subsequently on the place of the rope which permits the most favorable handling.

The telescopic pole can be held with both hands in order to position the cutting tool on the corresponding branch. The pull rope is at all times properly wound up by the rope storage. Even with an extremely oblique position, it is held practically parallel to the pole. The pull grip is therefore always located within the reach of the hand.

Other features of the invention are set forth in the dependent claims.

Embodiments of the invention will be described below with reference to the drawing, in which:

FIG. 2 is a side view of the pull grip;

FIG. 3 is a section along the line III—III of FIG. 2;

FIG. 4 is a view of the pull grip of FIG. 2, seen from above;

FIG. 6 is a view of a modified embodiment of the pull grip;

FIG. 10 is a sectional view of the pull grip of the invention with release device;

FIG. 11 is a partial section through the pull grip turned 90° from FIG. 10;

FIG. 12 shows the pull grip of FIG. 10 in its pressed position of release;

FIG. 13 is a partial sectional view corresponding to FIG. 11 in the pressed position of the release device.

Figure 8:
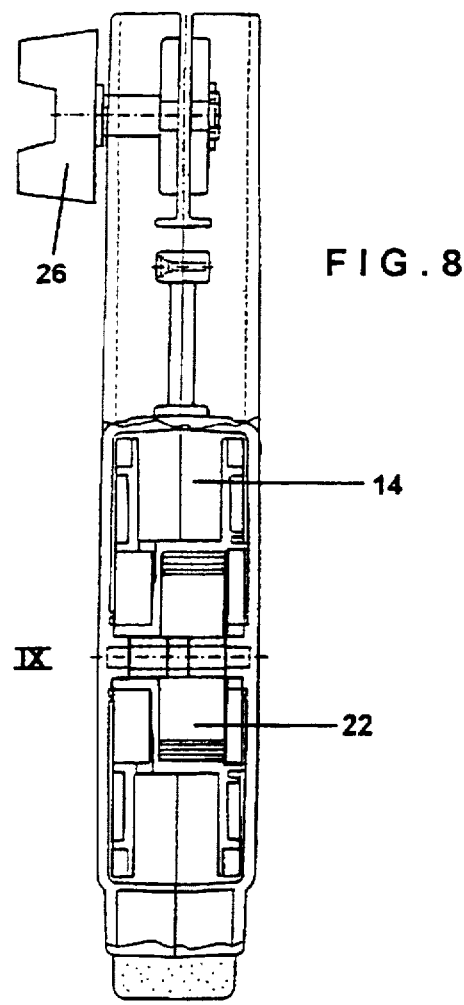
FIG. 8 is a section along the line VIII—VIII of FIG. 7.
Figure 9:
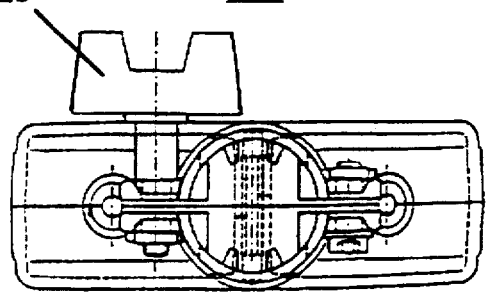
FIG. 9 is a section along the line IX—IX of FIG. 7.

The device of the invention has a rope storage consisting of a housing 10 with rope reel and pole-fastening sleeve as well as a pull grip 20 for the pull rope 16 which can be wound on the rope reel 14 (FIG. 8) within the housing 10 by means of a flat spiral spring 22. The end of the pull rope has a spring snap 18 by which a manual cutting tool can be attached to the pull rope. The pull rope 16 can, however, also be attached directly to a hand cutting tool. The pull grip 20 can also be used without rope storage together with a loosely hanging pull rope, in which case the length of the pull rope can be adapted in each case to the place most convenient for handling. In combination with the rope storage, which can be fastened on the end of the pole, assurance, however, is had, even in the case of a telescopic pole of extendable length, that the pull rope can always be grasped with the pull grip in the vicinity of the pole.

The rope storage is provided at its lower end with a soft rubber pad 24 by which the rope storage, with the pole inserted into the pole-fastening sleeve 12, can be supported against the body as abutment, whereby sliding is prevented, without unpleasant pressure points being caused on the body.

By means of a clamping screw 26, the pole of different diameter not shown in the drawing, for instance an extendable telescopic pole, is clamped fast on the rope storage.

Figure 1:
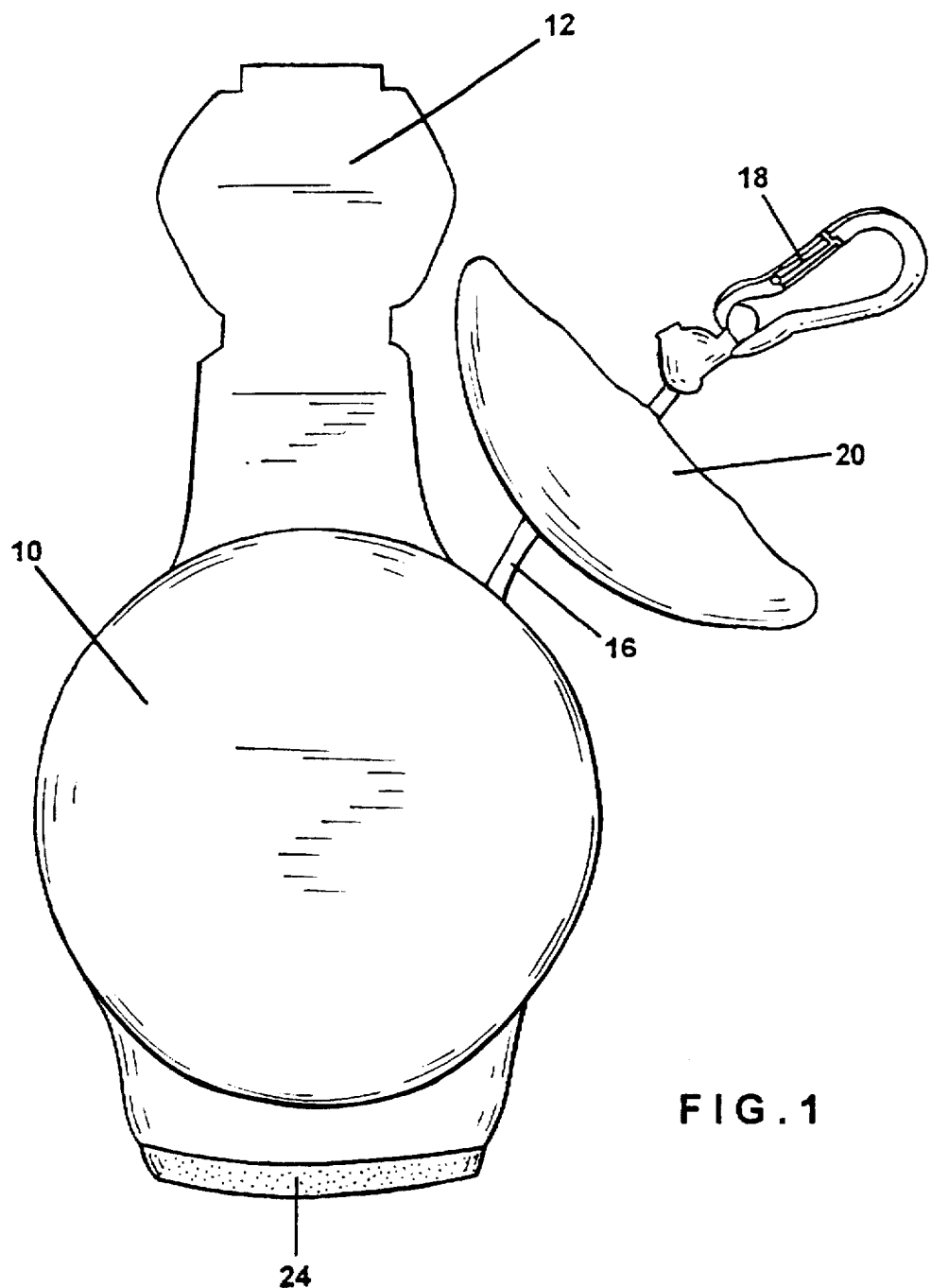
FIG. 1 is a diagrammatic showing of the rope storage of the invention with pull grip.
Figure 5:
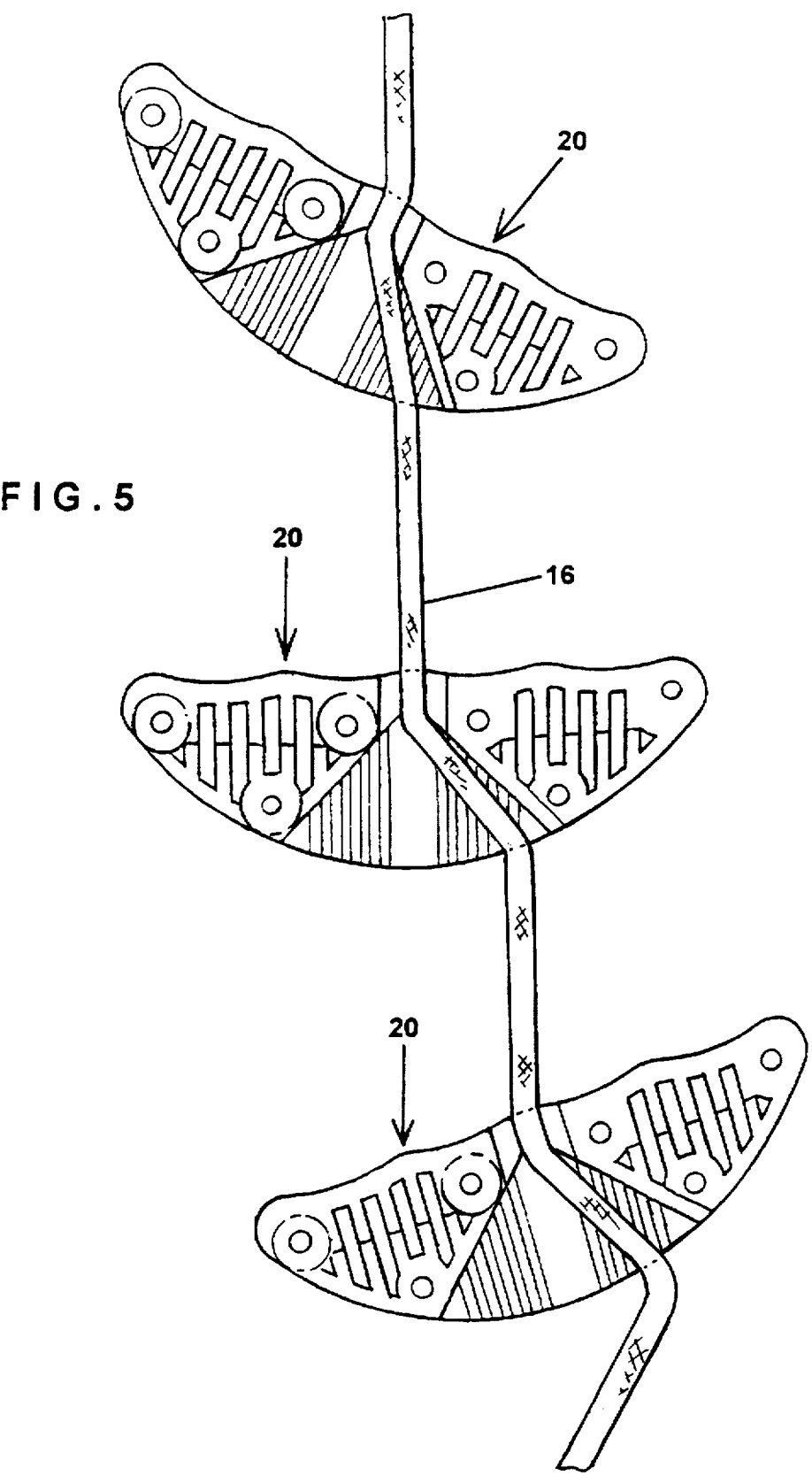
FIG. 5 is an operating diagram of the pull grip.
Figure 7:
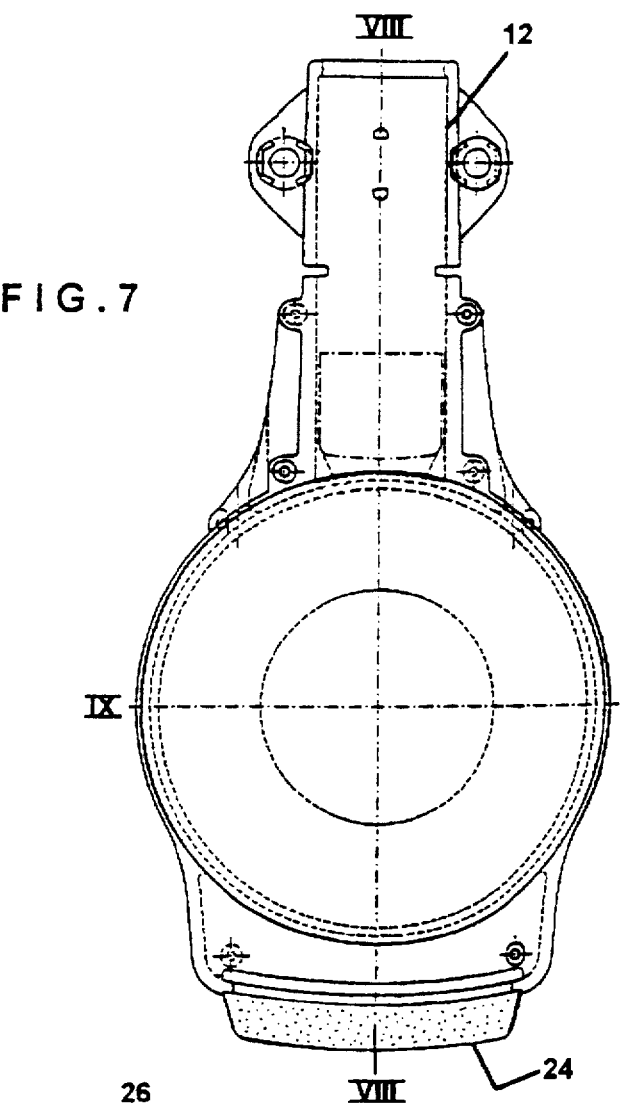
FIG. 7 is a view of the rope storage.

The pull grip 20 shown in FIGS. 2 to 6 is so developed that it can be attached to any point of the pull rope 16 in such a manner that the pull rope can be actuated by the pull grip. The pull grip 20 is developed in the form of a circular segment which is provided at its top with a finger-resting surface 28. In the middle, the pull grip has a passage hole 30 for the pull rope 16, whereby the pull grip remains connected in unlosable manner to the pull rope. Adjoining the passage hole 30 on the inside there is a free angular segment recess 32 which is provided on its side with clamping ribs 34 which, as can be noted from FIG. 3, converge towards the passage hole 30. As can be noted from the top showing in FIG. 5, the rope 16 is clamped between the clamping ribs 34 by a slight tilting. For the cutting, the pull grip, as can be noted from the middle showing in FIG. 5, is then held at an angle of 90° to the rope in order to transmit the pulling force in a comfortable position of the hand.

For loosening, the rope—as can be noted from the bottom showing in FIG. 5—is held by one hand below the pull grip 20 and the grip is moved with a jerk slightly upward with the other hand, so that the rope comes free of the clamping ribs 34.

FIG. 6 shows a modified embodiment in which an outwardly open, meander-shaped groove 36 is provided on the rear of the pull grip, into which groove a rope, fastened at both ends, can be inserted at any desired place. The groove passes into the hole 30 so that the pull grip remains firmly attached to the rope. The pull grip is then held fast at any desired place on the rope by clamping between the clamping ribs 34, as has been described with reference to FIG. 5.

FIGS. 10 to 13 show another embodiment of the pull grip shown in FIGS. 2 to 6. The pull grip 20 with its angular-segment recess 32 and the clamping ribs 34 corresponds to the showing of FIGS. 2 to 5. The pull grip of FIGS. 10 to 13 differs from that pull grip by a release device by which the pole rope can be conveniently lifted out of the clamping ribs 34. For this purpose, the central passage hole 30 is widened in diameter and the pull grip is continued upwards in a bearing sleeve 38 which, together with the passage hole 30, guides a release sleeve 40 in axially displaceable manner. The release sleeve is provided on its outer end with a finger grip 42 by which the front end of the sleeve can be pushed, against the restoring force of a compression coil spring 44, into the region of the angular-segment recess, as can be noted from FIGS. 12 and 13, so that the rope (not shown in FIGS. 10 to 13) which is guided through the sleeve can be lifted out of the clamping ribs 34. The compression coil spring 44 rests on one end against a shoulder on the bearing sleeve 38 and on the other end against a shoulder on the release sleeve, as a result of which the finger grip, together with the release sleeve, is brought back into the starting position shown in FIGS. 10, 11 in which the rope, guided by the release sleeve 40, can be introduced into the clamping ribs 34 and held in them. This starting position is defined by two diametrically opposite snap hooks 46 which are developed on the lower end of the sleeve 40 and extend in paraxial grooves 48 in the angular-segment recess 32. In the starting position shown in FIGS. 10 and 11, the snap hooks 46 grip on a shoulder 50 within the groove, so that in this way a further pushing out by the force of the spring 44 is prevented. One particular advantage of this embodiment shown in FIGS. 10 to 13 is that this grip is developed as a one-hand grip, i.e. it can be clamped with one hand by placing it in an oblique position and it can be released from the rope by elimination of the clamping by grasping the finger grip.

We claim:

1. A pull grip for a pull rope via which a tool fastened on one end of a pole can be operated, the pull grip having a passage channel and a clamping device for the pull rope, the passage channel is developed as a centrally arranged passage hole and the clamping device is developed as an angular hole segment recess having a narrowed angular side which adjoins the passage hole, the recess being defined by opposite, spaced apart angular segment sides, each side having clamping ribs thereon, the opposite side clamping ribs converge laterally towards the passage hole, and the converging clamping ribs are so arranged laterally in the angular segment recess that the pull grip is clamped fast upon the pull grip and the ribs thereof having an oblique position with respect to the rope.

2. A pull grip according to claim 1, wherein the pull grip has a meander-shaped open groove for the insertion of a rope and the groove communicates into the passage hole.

3. A pull grip according to claim 1, further comprising a manually actuatable release device for lifting the rope out of the clamping ribs of the angular segment recess and causing the rope to be releasable from the pull grip.

4. A pull grip according to claim 3, wherein the release device comprises a release sleeve extending in the passage hole and which guides the pull rope in the release sleeve and the release sleeve can be inserted from the passage hole into the region of the angular segment recess.

5. A pull grip according to claim 4, further comprising a return spring for bringing the release sleeve into a starting position out of the segment recess and returned to the passage hole, the release sleeve is connected with a finger grip.

6. A pull grip according to claim 5, further comprising a bearing sleeve formed on the pull grip, wherein the bearing sleeve guides the release sleeve and the return spring, the spring has one end which rests against an angular shoulder in the finger grip and has another end which is supported by a shoulder on the release sleeve.

7. A pull grip according to claim 4, wherein the release sleeve has a front end, snap hooks on the front end, grooves in the angular segment recess which receive the snap hooks, a shoulder in the angular segment recess for supporting the hooks in a release position of the release sleeve.

8. A pull grip according to claim 1, further comprising a winding device for the pull rope which can be fastened on the pole and which can be operated by the pull grip, the winding device having a pole-fastening sleeve for the insertion of the lower end of the pole and a rope reel under spring initial tension contained within a reel housing.

9. A pull grip according to claim 8, further comprising a soft rubber pad on the lower part of the reel housing.

* * * * *